INSTRUCTION AND OPERAND PROCESSING

Filed Aug. 28, 1964 6 Sheets-Sheet 1

INVENTORS:
James E. Kinzie
John W. Pross, Jr.
Robert B. Steves
Arville T. Trostrud
By
Attorney INVENTORS
James E. Kinzie
John W. Pross, Jr.
Robert B. Steves
Arville T. Trostrud By Attorney Fig. 4
| | T5 | T4 | T3 | T2 | T1 |
|---|---|---|---|---|---|
| P27 | 0 | 0 | 0 | 0 | 0 |
| P26 | 0 | 0 | 0 | 0 | 1 |
| P25 | 0 | 0 | 1 | 1 | 1 |
| P24 | 0 | 0 | 1 | 1 | 0 |
| P23 | 0 | 0 | 1 | 0 | 0 |
| P22 | 0 | 0 | 1 | 0 | 1 |
| P21 | 0 | 1 | 1 | 1 | 1 |
| P20 | 0 | 1 | 1 | 1 | 0 |
| P19 | 0 | 1 | 1 | 0 | 0 |
| P18 | 0 | 1 | 1 | 0 | 1 |
| P17 | 1 | 1 | 0 | 1 | 1 |
| P16 | 1 | 1 | 0 | 1 | 0 |
| P15 | 1 | 1 | 0 | 0 | 0 |
| P14 | 1 | 1 | 0 | 0 | 1 |
| P13 | 1 | 0 | 1 | 1 | 1 |
| P12 | 1 | 0 | 1 | 1 | 0 |
| P11 | 1 | 0 | 1 | 0 | 0 |
| P10 | 1 | 0 | 1 | 0 | 1 |
| P9 | 0 | 1 | 0 | 1 | 1 |
| P8 | 0 | 1 | 0 | 1 | 0 |
| P7 | 0 | 1 | 0 | 0 | 0 |
| P6 | 0 | 1 | 0 | 0 | 1 |
| P5 | 1 | 0 | 0 | 1 | 1 |
| P4 | 1 | 0 | 0 | 1 | 0 |
| P3 | 1 | 0 | 0 | 0 | 0 |
| P2 | 1 | 0 | 0 | 0 | 1 |
| P1 | 0 | 0 | 0 | 1 | 1 |
| P0 | 0 | 0 | 0 | 1 | 0 |
| Redundant States | 1 | 1 | 1 | 1 | 1 |
| | 1 | 1 | 1 | 1 | 0 |
| | 1 | 1 | 1 | 0 | 0 |
| | 1 | 1 | 1 | 0 | 1 |
Fig. 5 (Indexing Operation)
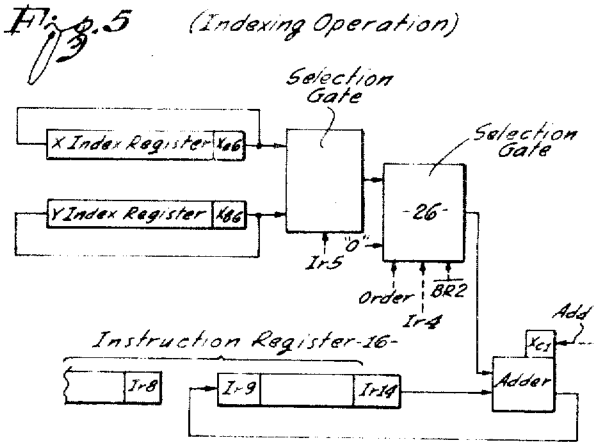
Fig. 6 (Control Phase Diagram)
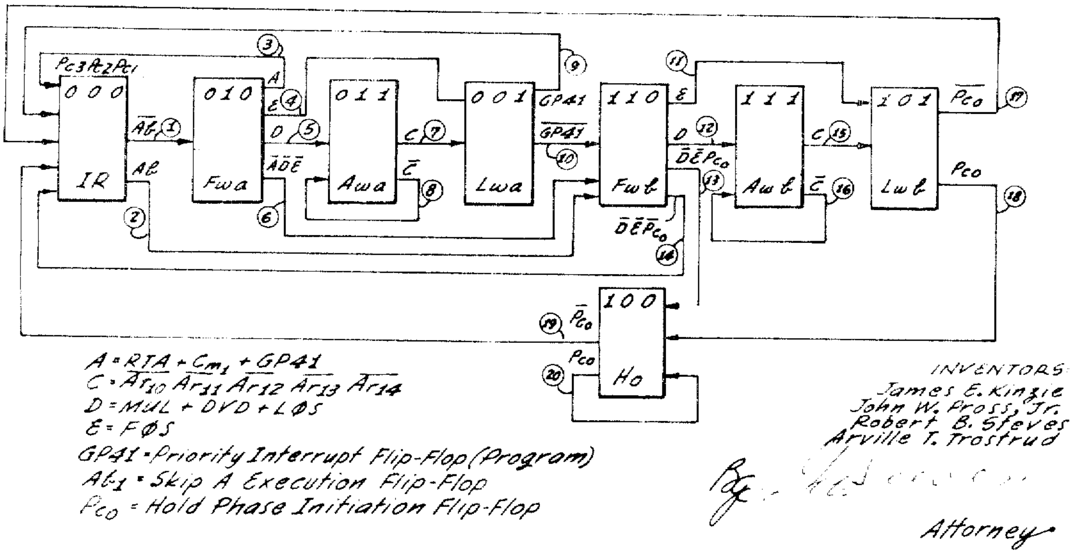
A = RTA + Cm1 + GP41
C = Ar10 Ar11 Ar12 Ar13 Ar14
D = MUL + DVD + LØS
E = FØS
GP41 = Priority Interrupt Flip-Flop (Program)
Ab1 = Skip A Execution Flip-Flop
Pc0 = Hold Phase Initiation Flip-Flop
INVENTORS
James E. Kinzie
John W. Pross, Jr.
Robert B. Steves
Arville T. Trostrud
By
Attorney

INSTRUCTION AND OPERAND PROCESSING

Filed Aug. 28, 1964 6 Sheets-Sheet 4

Fig. 7

| Pc 1 | | Pc 2 | | Pc 3 | |
|---|---|---|---|---|---|
| Phase | Path (Fig. 6) | Phase | Path (Fig 6) | Phase | Path (Fig 6) |
| Fwa | 4 | IR | 1 | IR | 2 |
| Fwa | 5 | IR | 2 | Fwa | 6 |
| Awa | 7 | Fwa | 5 | Lwa | 10 |
| Awa | 8 | Fwa | 6 | Fwb | 11 |
| Fwb | 11 | Awa | 8 | Fwb | 12 |
| Fwb | 12 | Lwa | 10 | Fwb | 13 |
| Awb | 15 | Fwb | 12 | Awb | 15 |
| Awb | 16 | Awb | 16 | Awb | 16 |
| | | | | Lwb | 18 |
| | | | | Ho | 20 |

Fig. 8 (Developement of Phase Control Logic)

| Path (Fig. 6) | Logic |
|---|---|
| 1 | At1 |
| 2 | At1 |
| 4 | E |
| 5 | D |
| 6 | $\bar{A}\,\bar{D}\,\bar{E}$ |
| 7 | C |
| 8 | $\bar{C}$ |
| 10 | GP41 |
| 11 | E |
| 12 | D |
| 13 | $\bar{D}\bar{E}$Pco |
| 15 | C |
| 16 | $\bar{C}$ |
| 18 | Pco |
| 20 | Pco |

Fig. 9 (Load Index Operation)

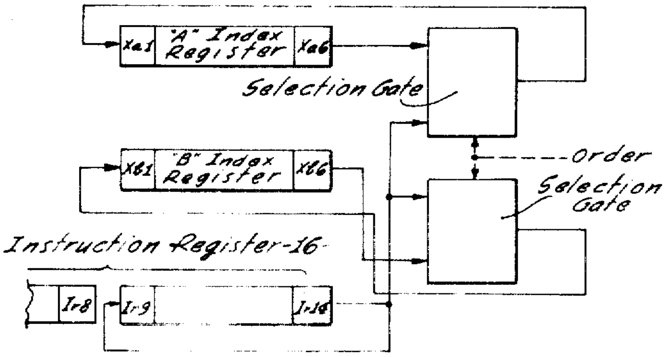

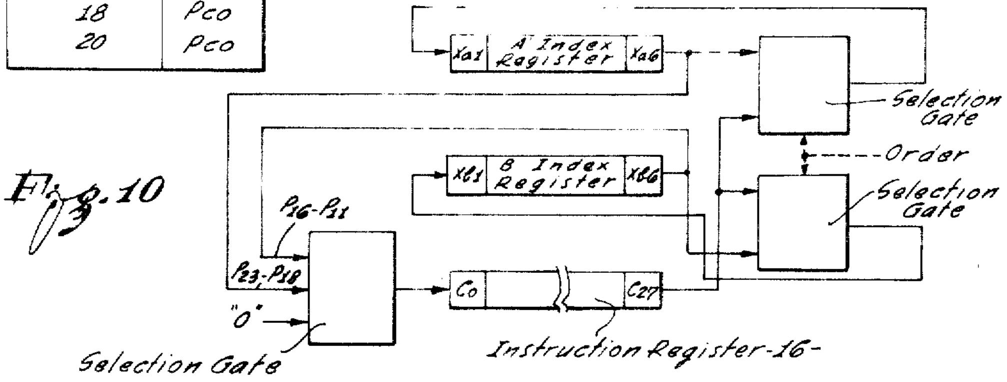

FIG. 10

(Data Transfer Instruction)

INVENTORS
James E. Kinzie
John W. Pross, Jr.
Robert B. Steves
Arville T. Trostrud By Attorney INVENTORS
James E. Kinzie
John W. Pross, Jr.
Robert B. Steves
Arville T. Trostrud
By
Attorney

INSTRUCTION AND OPERAND PROCESSING

Filed Aug. 28, 1964 6 Sheets-Sheet 6

INVENTORS:
James E. Kinzie
John W. Pross, Jr.
Robert B. Staves
Arville T. Trostrud By Attorney United States Patent Office 3,340,513 Patented Sept. 5, 1967

3,340,513
INSTRUCTION AND OPERAND PROCESSING

James E. Kinzie, John W. Pross, Jr., and Robert B. Steves, Vista, and Arville T. Trostrud, Encinitas, Calif., assignors to General Precision, Inc., a corporation of Delaware Filed Aug. 28, 1964, Ser. No. 392,681
6 Claims. (Cl. 340—172.5)

ABSTRACT OF THE DISCLOSURE

The present invention is directed to the control section of an improved general purpose digital computer. The computer uses a double instruction concept, in that each instruction word actually contains two instructions. Also, flexibility is achieved by means of index registers whereby the operand address in each instruction may be modified; and also by an augmenting register, whereby the operand addressing capability of each instruction may be extended.

The present invention relates to electronic digital computers, and it relates more particularly to an improved high speed general purpose computer which is particularly adapted to be mounted in airborne vehicles.

The principal objective of the invention is to provide a high speed, light weight, low power digital computer, which is extremely reliable in its operation and which exhibits capabilities comparable with computers many times its size, weight and cost.

A feature of the computer of the present invention is the provision of an improved system for processing instructions and operands whereby a large number of operands may be addressed in memory with relatively simple circuitry and relatively short instruction words, and whereby a high degree of flexibility may be achieved.

Other objects and advantages of the improved computer of the invention will be appreciated from the following description, when the description is considered in conjunction with the accompanying drawings, in which:

FIGURE 4 is a table representative of the different states of a bit counter incorporated in the computer;

Figure 11:
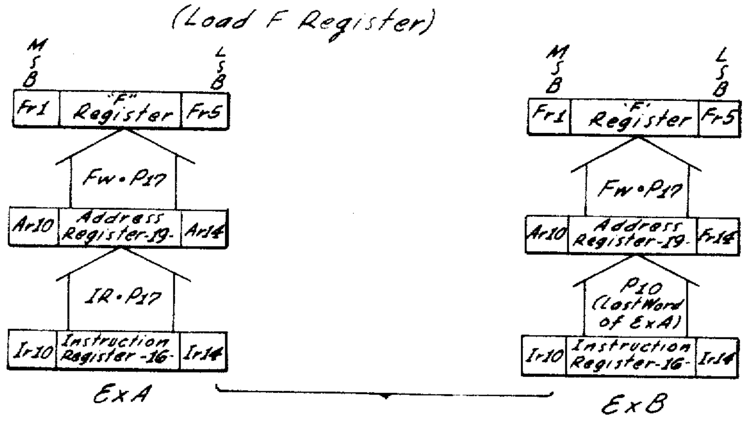
Figure 12A:
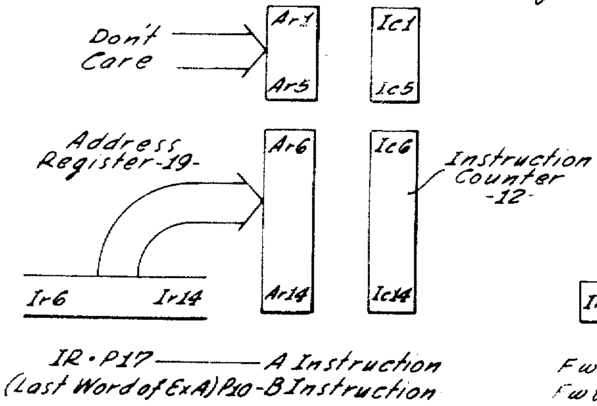
Figure 12B:
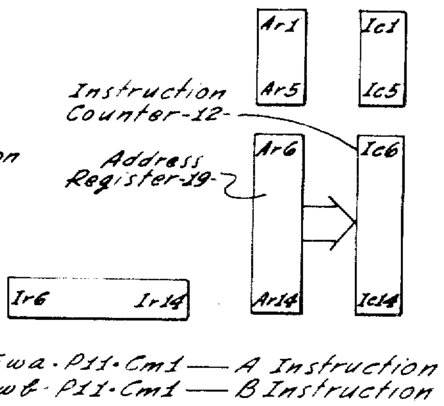
Figures 12C, 12D:
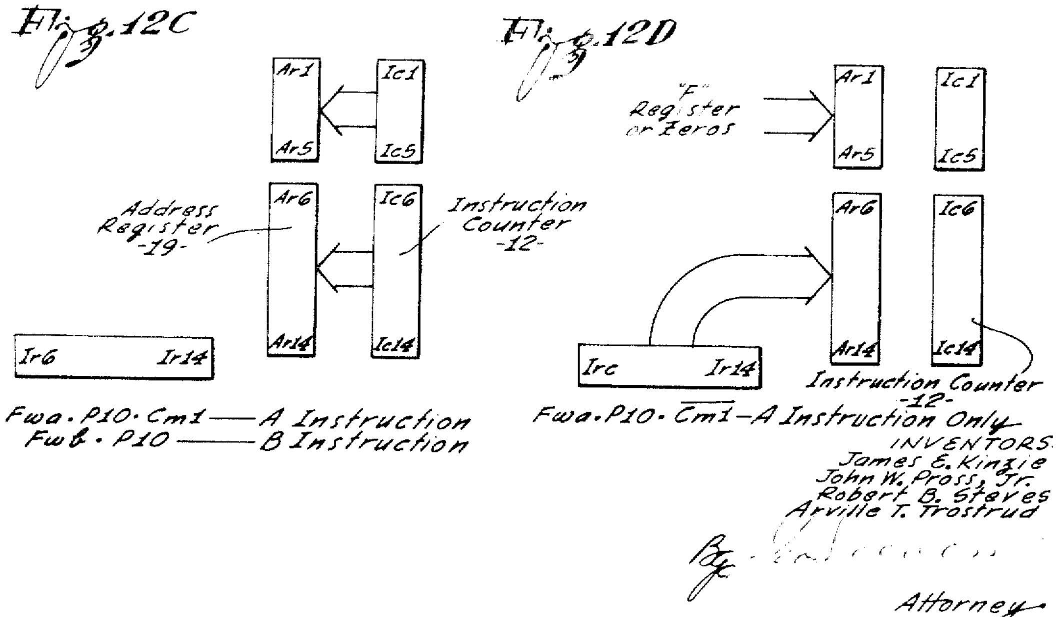
Figure 13A:
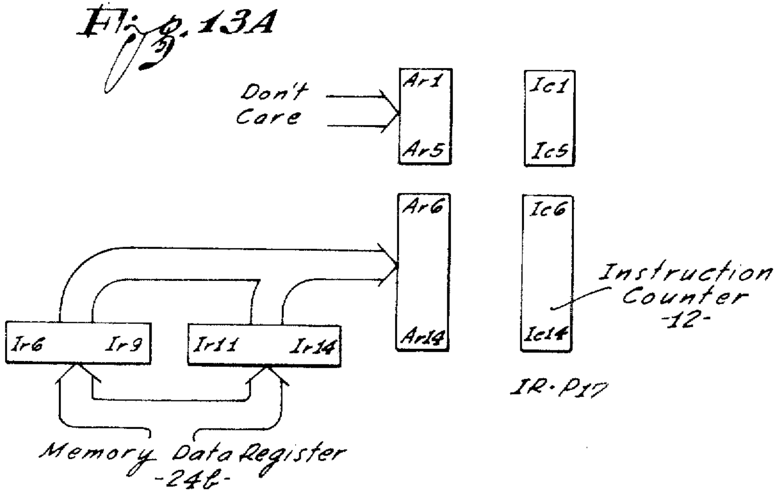
Figure 13B:
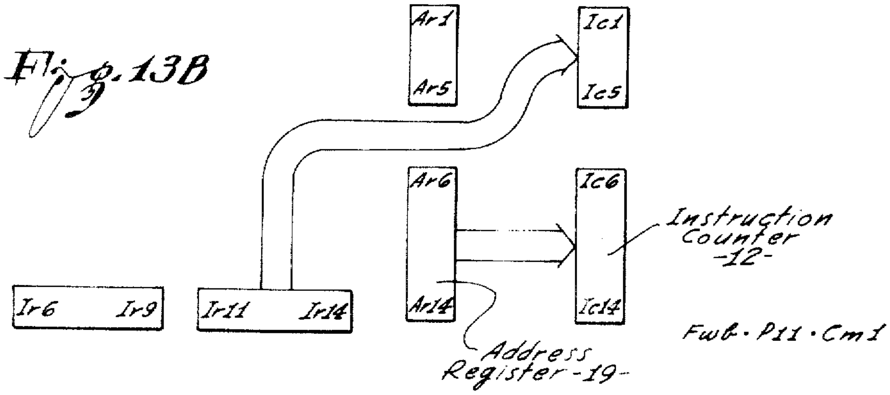
Figure 13C:
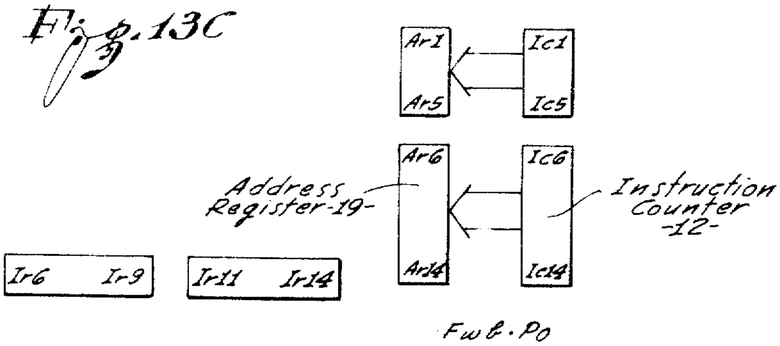

FIGURE 5 indicates an indexing operation performed in the computer, whereby a large number of addresses may be designated with a minimum number of bits in any particular instruction;

FIGURE 6 is a block diagram indicative of the different control phases of the computer;

FIGURE 7 is a table showing the different phases;

FIGURE 8 is a further table useful in explaining the phase control logic of the computer;

FIGURE 9 is a schematic diagram indicating the manner whereby the index registers of the computer may be loaded;

FIGURE 10 is a block diagram indicating the manner by which data is transferred between various registers in the computer;

FIGURE 11 is a schematic representation of the manner whereby a particular register in the computer may be loaded;

FIGURES 12A–12D are schematic representations of certain branching operations which may be performed by the computer; and FIGURES 13A–13C are further schematic representations of another type of branching operation which may be performed by the computer.

As will be described, the computer disclosed herein utilizes delay flip-flop circuits which have a single input. The state of the flip-flop is determined by the state of the input logic, when clocked. The flip-flop circuits also contain clock allow (C.A.) logic which is capable of selectively inhibiting the clock so as to make the flip-flop unresponsive thereto. The clock allow logic is included in the following description only when it may have a state other than "1."

The computer to be described utilizes a parallel type memory, yet the computer operates in a serial manner. The computer utilizes double instruction words, and these are selected on a sequential basis by an instruction counter.

When a new instruction is selected it appears in a data register portion of the memory. Then the first instruction is fed into an instruction register. A pair of index registers are included in the computer, separate from the memory, which are capable of modifying the operand address portion of the instruction in the instruction register. A pair of bits is included in each instruction to designate which, if either, of the index registers is to be selected.

The order portion of the instruction in the instruction register is then fed to an order register, and the operand address portion is fed to an address register. At this time, the second instruction is transferred from the memory register into the instruction register.

An additional register is included, which may be modified from time to time, and this latter register is used to designate which field in the memory is to be addressed by the operand address in the address register. Each instruction includes a bit which indicates whether or not the additional register is to be ignored. This register effectively adds, for example, additional bits to the operand addressing capabilities of each instruction and obviates the requirement of excessively long instruction words.

As mentioned above, the computer of FIGURE 1 is particularly constructed to meet the requirements of aircraft and space vehicle guidance systems. However, it will become evident as the description proceeds that the computer has general utility wherever the capabilities of a general purpose computer are required.

Figure 1:
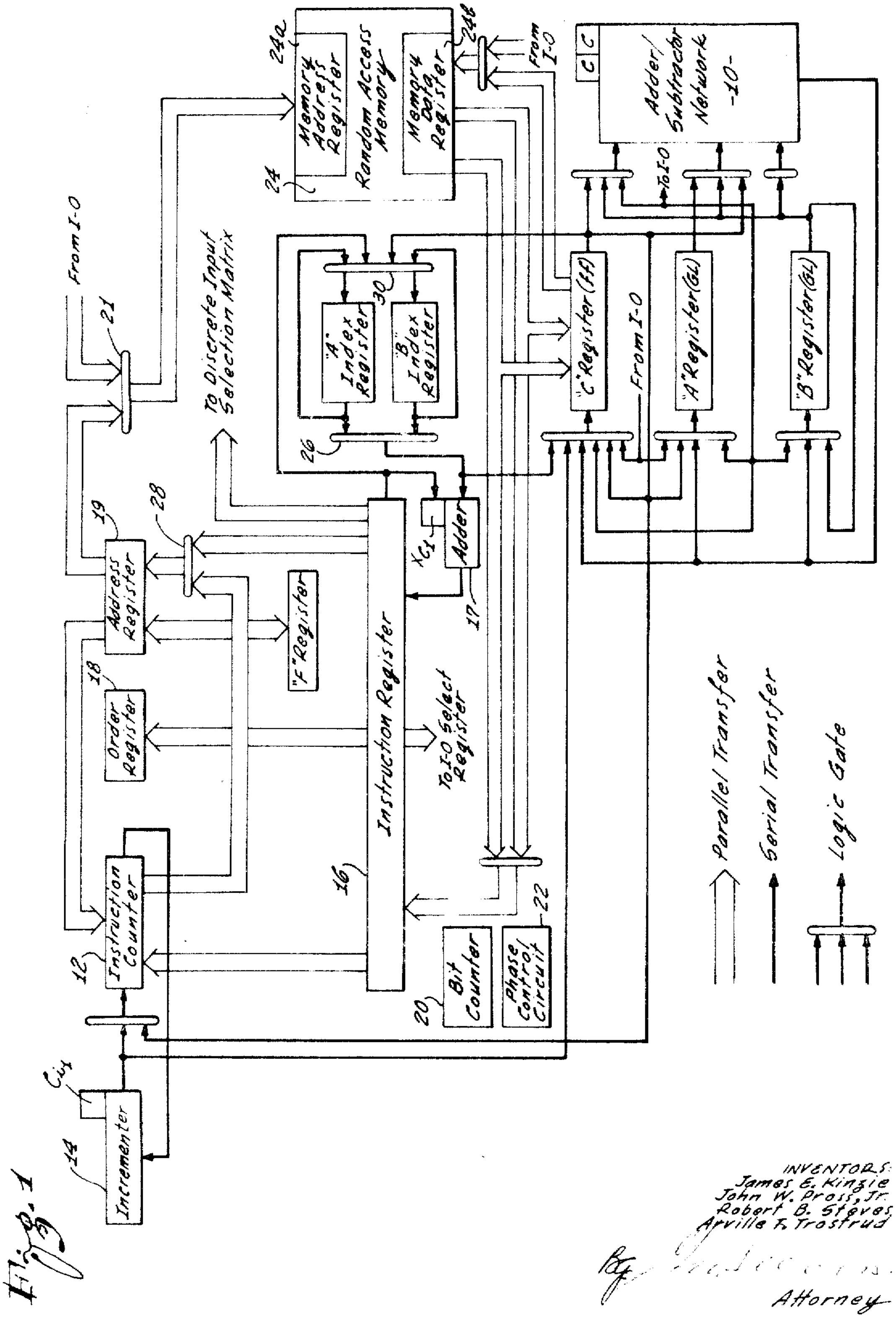
FIGURE 1 is a block diagram of one embodiment of the improved general purpose digital computer of the present invention.

The computer of FIGURE 1 includes, as is usual in general purpose digital computers, a memory section, a control section, an arithmetic processing section, and an input-output section. The computer of FIGURE 1 is constructed so that the control section and arithmetic processing section can operate in conjunction with a wide variety of different memory selections. The arithmetic section is described and claimed in copending application Ser. No. 392,708 filed Aug. 28, 1964. Moreover, the computer is constructed to accommodate a wide variety of different input-output sections. An appropriate input-output section is described and claimed in copending application Ser. No. 385,280 filed July 27, 1964.

As shown in FIGURE 1, the arithmetic processing section of the computer includes three registers. These registers are designated A, B and C respectively. The arithmetic processing section also includes a three-input adder-subtractor network 10, and appropriate logic circuitry coupling the adder 10 to the aforesaid registers. This section is more fully described in the copending application Ser. No. 392,708 referred to above.

The A and B registers are of the dynamic circulating type, and they may incorporate appropriate "zero" temperature coefficient glass delay lines. The C Register, on the other hand, is a static type, and it may be formed of a plurality of flip-flops. The flip-flops themselves may be constituted by integrated circuit components, such as current mode silicon micro-circuits.

Other static registers in the computer, to be described, may also be formed of integrated circuit flip-flops and associated components. By the use of such elements, the desired small size, low weight, low power consumption and high reliability of the computer may be realized.

As mentioned above, the arithmetic processing section of the computer is composed of the A, B and C Registers, of the three-input adder 10, and of the associated logic. The A Register will sometimes be referred to as the main or "upper accumulator" and the B Register will sometimes be referred to as the "lower accumulator."

The computer of FIGURE 1 uses the single address sequential instruction format. That is, the different instructions are stored in the memory at sequential address locations. An appropriate counter, as will be described, selects each instruction in sequence, as the successive instructions are executed.

Figure 2:
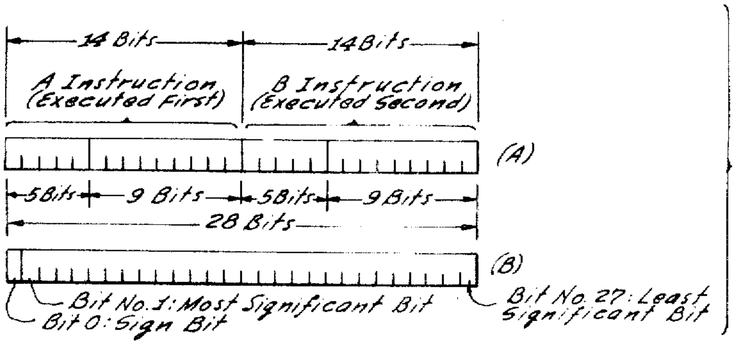
FIGURE 2 is a schematic representation of the composition of the words used in the computer.

Most instructions, as shown in FIGURE 2A, are coded as fourteen bits, so as to allow the storage in the memory of two instructions for each twenty-eight bit computer word. As shown, nine bits of each instruction of FIGURE 2A are devoted to the address of the operand to be executed, and five bits are devoted to the operation code for the order to be performed.

Some instructions use another format requiring all twenty-eight bits, and are consequently stored in memory on the basis of one instruction per memory word.

The computer word shown in FIGURE 2B is a typical operand, with the most significant bit being at the left of the information portion of the word. The left hand, or zero, bit is the sign bit, in accordance with the usual computer practice.

The control section of the computer of FIGURE 1 includes an Instruction Counter 12 and an Incrementer 14. The Instruction Counter 12 steps from one count to the next after each instruction is executed, so that the next instruction in the sequence may be addressed and selected from memory.

The Instruction Counter 12 is a flip-flop register, and it is used, as noted, to establish the sequential addresses of the instruction words, so that these words may be successively selected from the memory. The Instruction Counter 12 counts by circulating serially through the Incrementer 14.

The contents of the Instruction Counter 12, corresponding to a particular count at any particular time, may be shifted serially into the C Register. This permits the particular count of the counter 12 at any particular time to be preserved in the C Register, for example, when the computer enters sub-routines.

The control section of the computer includes an Instruction Register 16. This latter register is a 14-bit flip-flop register. Its flip-flops are designated I*r*1–I*r*14. The Instruction Register 16 receives instructions as they are read out of the memory system of the computer, and it holds the B intsruction (FIGURE 2A) while the A instruction is being executed. An adder 17 (with its carry flip-flop X*c*1) is included in the circuit of the Instruction Register 16 to permit the operand address portion of the instruction in the instruction register to be modified, as will be described.

The control section of the computer of FIGURE 1 also includes a pair of Index Registers A and B. These are used to modify the operand address of the instruction in the Instruction Register 16. Each of the Index Registers A and B is formed as a 6-bit flip-flop register. The A Index Register includes flip-flops X*a*1–X*a*6; and the B Index Register includes flip-flops X*b*1–X*b*6. The Index Registers may be decremented on programmed commands, as will be described. The contents of either the A or B Index Register may be transferred to the C Register. Also, the A or B Index Registers may be set from the address portion of an instruction, as will also be described. The contents of the A and B Registers may be introduced to the adder 17 through a selection gate 26.

It will be appreciated, therefore, that either the A or the B Index Register may be selected to modify the least six bits of the 9-bit operand address portion of the instruction in the instruction register. Also, the contents of the index registers themselves can be altered in various ways for increased flexibility.

The control section of the computer also includes an Order Register 18 and an Address Register 19. As explained above, these registers receive the order and address portions of the instruction in the Instruction Register 16. The Order Register 18 is made up of five flip-flops (O*r*1–O*r*5), and it holds the operation code during the execution of an instruction. The Address Register 19 is made up of fourteen flip-flops (A*r*1–A*r*14), and it holds the operand address portion of the instruction during the execution thereof. The order and address registers are set in parallel from the Instruction Register 16.

A Bit Counter 20 is included in the control section of the computer, in accordance with usual computer practice. This Bit Counter is a five flip-flop counter, and it steps once for each clock pulse. In the particular embodiment, the bit counter steps through a count of twenty-eight, and the successive configurations of the counter are decoded to provide twenty-eight distinctive bit timing pulses during each word time.

The control section of the computer 10 also includes a phase control circuit 22, and this circuit is made up of a plurality of phase control flip-flops. These flip-flops establish the different operational phases of the computer, including "Instruction Read (IR)," "Additional Word (A*w*)," "Last word (L*w*)," "Hold (H*o*)," and so on.

An F Register is also included in the control section of the computer. This is a flip-flop register, and it is used to augment the nine-bit operand addresses which are explicitly coded in each instruction (FIGURE 2A), as mentioned above. The use of the F Register effectively adds five bits to the operand address portion of each instruction. This allows, for example and as will be described, up to 16,384 memory locations to be addressed with only nine bits in the address field of each of the FIGURE 2A instructions.

The memory section of the computer includes, for example, a random access code memory 24. The memory may contain, for example, up to 16,380 words of various types of random access parallel storage. A temporary or "scratch pad" memory is assigned to a portion of the memory 24.

The scratch pad memory section can be reached at any time, regardless of the setting of the F Register. Any instruction which seeks to address this section of the memory includes a bit which causes the F Register to be ignored. That is, in order to avoid having to reset the F Register to zero each time "scratch pad" memory access is desired, the most significant bit of the operand address is used as a control bit. If this control bit is a 1, the address is augmented by the F Register, and if it is a 0, the F Register is treated as being at 0. Thus, operands are restricted to those addresses in memory which have the most significant bit as a 1, that is, in one-half of the memory. The F Register is not used for instruction addresses.

To allow complete memory access, a flip-flop provides conditional control of the use of the F Register to augment the operand addresses. This flip-flop may be set or reset by a programmed command. When the flip-flop is set, all the 9-bit operand addresses are augmented by the five bits of the F Register regardless of whether the aforesaid control bit is a "1" or "0." When the flip-flop is reset, the F Register augments only those 9-bit operand addresses whose most significant (control) bit is a 1.

The memory 24 includes its own Address Register **24*a*, its own Memory Data Register 24*b* (composed of twenty-eight flip-flops Md0–Md27) and its own power, control and timing systems. Only two control signals are sent into the memory system 24**; one of the signals indicating whether to read out of memory or to store data in memory, and the other commanding an initiation of the memory cycle.

The memory 24 may be addressed through an "or" gate 21, either by the Address Register 19 in the control section, or by the input-output section of the computer. Input-output memory addressing facilitates high speed operations. Data inputs may be desired from the C Register in the arithmetic section, or from the input-output section. Suitable manual control may also be provided.

Under the control of the Bit Counter 20, the digital computer of the invention operates serially in a succession of word times, and it proceeds serially through each word time from P27 bit time to P0 bit time (MSD). The computer is caused to operate in different phases, as established by the phase control circuit 22.

For example, certain phases to be described will be the "Instruction Read Phase" (IR), during which a new instruction is read into the Instruction Register 16, as will be described. Following the IR phase, the computer enters "Execute Instruction A," during which the A instruction (FIGURE 2A) is executed. The computer then enters "Execute Instruction B" during which the instruction B (FIGURE 2A) is executed.

Figure 3A:
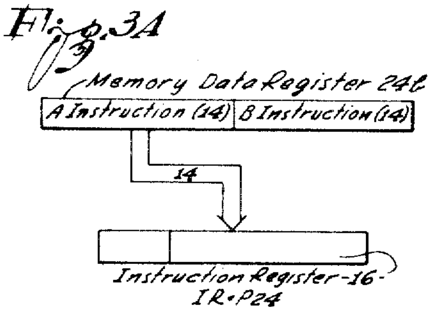
FIGURES 3A–3F are schematic diagrams representing the manner in which instructions are processed in the computer of the invention.

During the word time preceding an Instruction Read phase (IR), a memory cycle is initiated so as to obtain the new instruction from the memory 24. At P24 bit time of IR, the fourteen most significant bits in the Memory Data Register 24b comprising the A instruction, are transferred to the Instruction Register 16 (FIGURE 3A).

Figure 3B:
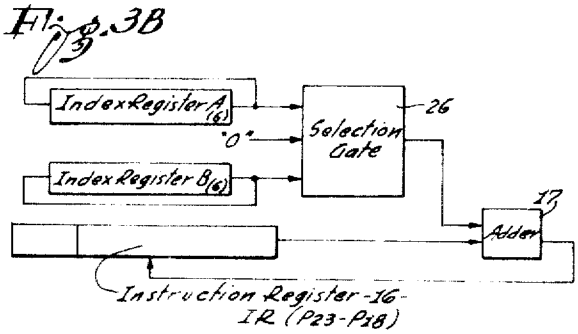

For the next six bit times (P23–P18) of IR, the least six operand address bits of the A instruction recirculate through the two-input adder 17 in the Instruction Register circuit (FIGURE 3B). The second input to the adder 17 is derived from the selection gate 26. The selection gate introduces the contents of the selected A or B Index Register to the adder 17 so that the aforementioned least six operand address bits may be modified, if so desired. If no such modification is required, the second input to the adder 17 is made 0.

Figure 3C:
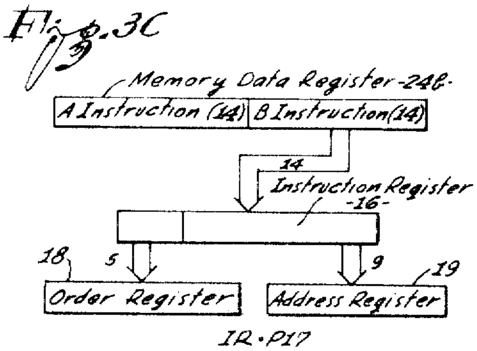

The next bit time (P17) of IR, the nine address bits of the A instruction are transferred to the Address Register 19, and the five order bits of the A instruction are transferred to the Order Register 18 (FIGURE 3C). At the same time, the fourteen least significant bits of the Memory Data Register 24b, which make up the B instruction, are transferred to the Instruction Register 16.

Figure 3D:
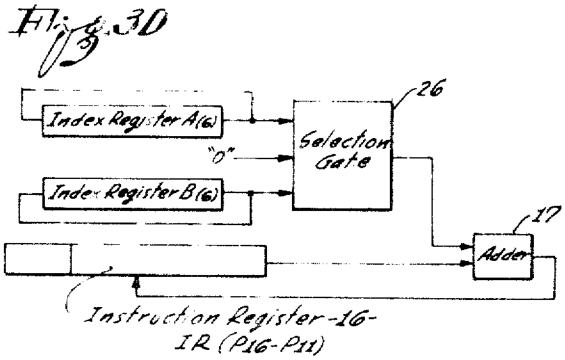

Indexing from the A or B Index Registers for the B instruction, if required, takes place during the next six bit times (P16–P11) (FIGURE 3D), in the same manner as for the A instruction. However, at the completion of the indexing operation, the B instruction remains stored in the Instruction Register 16.

Figure 3E:
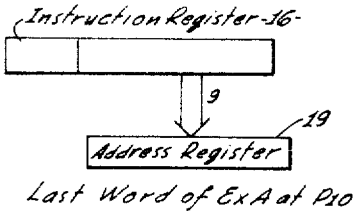
Figure 3F:
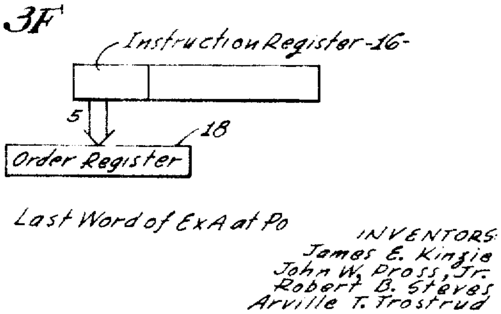

At P10 of the last word of the Execute A, the operand address portion of the B instruction is transferred to the Address Register 19 (FIGURE 3E). At the last bit time, P0, of the last word of Execute A, the order code of the B instruction is transferred to the Order Register 18 (FIGURE 3F).

As mentioned above, the Bit Counter 20 of FIGURE 1 is a five flip-flop, twenty-eight-state counter. This counter, as explained, identifies each bit time for each word. The Bit Counter 20 is constructed to be independent of the other components of the computer and to be self starting. The Bit Counter establishes the basic timing for the computer. The first bit time in each word is designated P27, as mentioned, and the last bit time is designated P0. Should the Bit Counter be activated in a redundant state, it will advance to the P17 configuration, after which it will remain in the indicated cycle.

The Bit Counter 20 is composed basically of two counters. These include a four-state counter (including flip-flops $T_1$ and $T_2$) and a seven-state counter, including flip-flops $T_3$, $T_4$ and $T_5$. The four-state counter advances independently, triggering the seven-state counter for each four bit times when $\overline{T_2}T_1=1$ (see FIGURE 4).

The various states of the Bit Counter 20 are shown in FIGURE 4, as corresponding to the different bit times. The redundant states are also shown. The control of the bit counter may be expressed logically as follows:

$$T_1=\overline{T_2}$$
$$T_2=T_1$$
$$T_3=\overline{T_4}.\overline{T_5}+\overline{T_3}.T_4.T_5$$
$$\text{C.A.}=\overline{T_2}.T_1 \text{ (clock allow logic)}$$
$$T_4=T_3$$
$$\text{C.A.}=\overline{T_2}.T_1$$
$$T_5=T_4$$
$$\text{C.A.}=\overline{T_2}.T_1$$

The fourteen flip-flop Instruction Register 16 (Ir1–Ir14) receives single instructions from the memory 24, as described above, and routes the component parts to the appropriate Address and Order Registers. Indexing from the selected A or B Index Register, if required, takes place in the Instruction Register 16, as explained, the least significant six bits of the operand address portion of the instruction in the register shifting into the adder 17 with the contents of the selected index register. In general, the Instruction Register 16 supplies data to the Order Register 18 and to the Address Register 19.

The A instruction, contained in the Memory Data Register 24b (Md0–Md13) (FIGURE 1) fed in parallel into the flip-flops Ir1–Ir14 Instruction Register 16 at P24 bit time of the instruction read-in phase, as explained in conjunction with FIGURE 3A. At P17 bit time, the A instruction is transferred to the Order Register 18 and Address Register 19, as explained, and the B instruction in the Memory Data Register 24b (Md14–Md27) is fed in parallel into the flip-flops Ir1–Ir14 Instruction Register 16. In the following equations, it is assumed that $\overline{Ab_1}=1$.

$$\left.\begin{array}{l} Ir1=Md0\ P24\ \overline{Ab1}+Md14\ P17 \\ \cdot \\ \cdot \\ \cdot \\ \cdot \\ \cdot \\ \cdot \\ Ir8=Md7\ P24\ \overline{Ab1}+Md21\ P17 \end{array}\right\}\text{C.A.}=(P24\text{–}P17)\ IR$$

$$\left.\begin{array}{l} IR9=Md8\ P24\ \overline{Ab1}+Md22\ P17 \\ \cdot \\ \cdot \\ \cdot \\ \cdot \\ Ir14=Md13\ P24\ \overline{Ab1}+Md27\ P17 \end{array}\right\}\text{C.A.}=(P24\text{–}P11)\ IR$$

Indexing from the selected A or B Index Register takes place during the IR phase from P23–P18 bit times (FIGURE 3B) for A instruction, and during P16–P11 bit times (FIGURE 3D) for B instruction. The least six bits of the Instruction Register are right shifted through the adder 17 whether or not indexing is indicated. If indexing is not required, recirculation without change takes place since the carry flip-flop Xc1 of the adder 17 remains low.

If indexing is required, either Xa6 or Xb6 is added to Ir14 depending upon which of the two index registers A or B is selected. The indexing adder logic is included in the Ir9 logic of the instruction register. The determination that an indexable instruction is in the instruction register is made by the Ir9 logic. The selection of the proper Index Register A or B is made by the Ir5 state, if indexing is indicated by the state of Ir4.

The carry flip-flop, Xc1, used in the indexing operation cannot set unless an indexable instruction is in the Instruction Register 16 and $Ir4=1$, in which case it functions as a normal carry for the two-input adder 17.

The following logic equations apply:

$$Ir9=[Ir4\,\overline{BR2}\,(ADD+LDS+SUB+MUL+DVD+STC)^{*}\,(Xa6\,\overline{Ir5}+Xb6\,Ir5)\,(\overline{Ir14}\,\overline{Xc1}+Ir14\,Xc1)+\overline{Ir4\,\overline{BR2}\,(ADD+LDS+SUB+MUL+DVD+STC)^{*}}\,(Xa6\,\overline{Ir5}+Xb6\,Ir5)\,(\overline{Ir14}\,Xc1+Ir14\,\overline{Xc1})]\,\overline{P24}\,\overline{P17}$$

$$C.A.=IR\,(P24\text{–}P11)$$

$$Ir10=Ir9\,\overline{P24}\,\overline{P17}$$
$$Ir11=Ir10\,\overline{P24}\,\overline{P17}$$
$$Ir12=Ir11\,\overline{P24}\,\overline{P17}$$
$$Ir13=Ir12\,\overline{P24}\,\overline{P17}$$
$$Ir14=Ir13\,\overline{P24}\,\overline{P17}$$

$$C.A.\ for\ Ir10\text{–}Ir14=IR(P24\text{–}P11)$$

$$Xc1=[(Xa6\,\overline{Ir5}=Xb6\,Ir5)\,Ir4\,\overline{BR2}\,(ADD+LDS+SUB+MUL+DVD+STC)^{*}\,(Xc1+Ir14)+Xc1\,Ir14]\,IR\,\overline{P24}\,\overline{P17}$$

To clarify the adder logic, it is assumed that the conditions for indexing are true, and that the A Index Register is chosen ($\overline{Ir}5=1$). (If $Ir5=1$, the **X*a*6 terms would be replaced by X*b*6** terms.)

$$Ir9=Xa6\,(\overline{Ir4}.\overline{Xc1}+Ir14.Xc1)+\overline{Xa6}\,(\overline{Ir14}.Xc1+Ir14.\overline{Xc1})$$

If the terms which indicate that indexing is to take place are not all true, **I*r*9** takes the following form:

$$Ir9=Ir14\,\overline{Xc1}\,.\,\overline{P24}\,.\,\overline{P17}$$

The above described indexing operation is represented by the schematic diagram of FIGURE 5.

The Address Register 19, as explained above, is a fourteen bit parallel register (**A*r*1–A*r*14) which supplies operand and instruction addresses to the memory 24. The Address Register 19 copies the instruction counter 12 to obtain the address of the next instruction. The information transfer to the address Register takes place at P10 bit time of the last word before the IR phase. The transfer from the Instruction Counter 12 to the Address Register 19 is carried out through an "or" gate 28 (FIGURE 1). Operand addresses are obtained from the I*r*6–I*r*14 of the Instruction Register through the "or" gate 28**, and from the F Register (as described). The F Register, as explained, is used to augment the operand addresses if $Ir6=1$, otherwise zeros are used.

The A operand address is fed in parallel into the Address Register 19 at P17 bit time of the Instruction Read (IR) phase; and the B operand address is introduced in parallel into the Address Register 19 at P10 bit time of the last word of Execute A.

If the B instruction is not to be executed, then the contents of the Instruction Counter 12 are copied through the "or" gate 28, and the contents of the Instruction Register 16 are ignored.

The logic associated with any one of the flip-flops **A*r*1–A*r*14 of the Address Register 19** may be expressed as:

$$Ar_{n}=Fr_{n}\,Ir6\,(Fwa\,\overline{\overline{Cm1\,RTA\,MUL\,DVD\,\phi\phi S\,BR2+IR+Lwa}})+Ic_{n}\,(Fwa\,Cm1\,RTA\,MUL\,DVD\,\phi\phi S\,BR2+\overline{IR}+\overline{Lwa})$$

$$n=1\text{–}5$$

$$C.A.=IRP17+[(Fwa\,\overline{BR2}+Fwb)\,\overline{\phi\phi S}+Lw+Ho]\,P10$$

$$Ar6=Ar14$$

$$Ar_{n}=Ir_{n}\,(Fwa\,\overline{\overline{Cm1\,RTA\,MUL\,DVD\,\phi\phi S\,BR2+IR+Lwa}})+Ic_{n}\,(Fwa\,\overline{Cm1\,RTA\,MUL\,DVD\,\phi\phi S\,\overline{BR2}+IR+Lwa})$$

$$n=6\text{–}14$$

$$C.A.=IRP17+[(Fwa\,\overline{BR2}+Fwb)\,\overline{\phi\phi S}+Lw+Ho]\,P10$$

The various terms in the above logic equations represent different instructions, as will be explained.

The Order Register (**O*r*1–O*r*5), designated 18 in FIGURE 1, holds the operation code during the execution of the corresponding instruction, as explained above. The Order Register 18 operates only in parallel receiving its information from the Instruction Register 16**. The order portion of the A instruction is fed into the Order Register at *IR.P*17; whereas, the order portion of the B instruction is strobed into the Order Register at P0 bit time of the last word of Execute A, as explained above.

The Order Register logic equations are as follows:

$$Or1=Ir1$$
$$Or2=Ir2$$
$$Or3=Ir3\cdot\overline{P24}$$
$$Or4=Ir4$$
$$Or5=Ir5$$

$$C.A.\ for\ Or1\text{–}Or5=IR(P24+P17)+Fwa\,P0\,\overline{MUL}\,\overline{DVD}\,\phi\phi S\,BR2+Lwa\,P0$$

The F Register of FIGURE 1, as explained above, provides storage for the supplementary address for the operands. The F Register is a five-bit flip-flop register (**F*r*1–Fr5), and its contents are transferred to the Address Register 19 to provide the five most significant bits for operand addresses. The F Register is loaded from the address field of a programmed instruction after the address has been transferred to the Address Register 19**.

The Instruction Counter 12 (**I*c*1–I*c*14) stores the address of the next instruction word. After an address is used, that is, transferred to the Address Register 19, the Instruction Counter 12 value is increased by one count. The counter recirculates through the Incrementer 14 each word time, the carry flip-flop C*i*1 associated with the Incrementer 14** being set only once per cycle at *Fwb.P*27. The Instruction Counter 12 receives fourteen shift pulses from *P*26–*P*13 of each word time. The carry flip-flop **C*i*1** sets at *Fwb.P*27 and remains set until $Ir14=0$.

$$Si1=P27;\ \overline{Si1}=P13$$

$$Ci1=Fwb\,P27\,\overline{Pr1}\,\overline{P27}\,\overline{Ao}\,Bwf\,Fw+Ic14\,Ci1$$

$$\left.\begin{array}{l}Ic1=(Ic14\,\overline{Ci1}+\overline{Ic14}\,Ci1)\,Si1\\ Ic_{n}=Ic_{n-1}\,Si1\\ n=2\text{–}14\end{array}\right\}C.A.=Si1$$

Each of the Index Registers A and B is composed of six flip-flops, designated **X*a*1–X*a*6 and X*b*1–X*b*6**, respectively, as described previously herein. The contents of either of the Index Registers A or B may be changed in one of three ways:

(A) They may be replaced by a segment of the address field in an instruction;

(B) They may be replaced by the number in a specific six bits of the C register; or (C) They may be decremented by one count.

The above changes may be controlled by a selection gate 30 (FIGURE 1) at the input of the registers.

The contents of the Index Registers A and B shift right through the adder 17 (FIGURE 1) for addition to the operand address in the Instruction Register 16, as described above. Both Index Registers make two complete cycles (P23–P18 and P16–P11) during the IR phase. Thereafter, each Index Register recirculates once for each word time. The A Index Register recirculates during P23–P18 bit times, and the B Index Register recirculates during P16–P11 bit times.

In the following equations, only the recirculation of the index registers is shown. The logic for loading the registers will be included in the description of the individual control orders.

$$\left.\begin{array}{l}Xa1=Xa6(IR+\overline{Xc1})\\ Xa2=Xa1\\ Xa3=Xa2\\ Xa4=Xa3\\ Xa5=Xa4\\ Xa6=Xa5\end{array}\right\}C.A.=IR(P16\text{–}P11)+(P23\text{–}P18)$$

$$\left.\begin{array}{l} Xb1=Xb6(IR+\overline{Xc1}) \\ Xb2=Xb1 \\ Xb3=Xb2 \\ Xb4=Xb3 \\ Xb5=Xb4 \\ Xb6=Xb5 \end{array}\right\} C.A.+(P16\text{–}P11)+IR(P23\text{–}P18)$$

assuming that $Xc1=1$ if $IR=0$.

As mentioned above, the different phases of the computer are controlled by the phase control circuit 22. This circuit includes three flip-flops Pc1, Pc2 and Pc3. FIGURE 6 indicates all possible phasing paths in the computer. As shown in FIGURE 6, the phase control flip-flops may assume the following configurations to represent the different phases:

$\overline{Pc1}.\overline{Pc2}.\overline{Pc3}$ ---- Instruction read-in phase (IR).

$\overline{Pc1}.Pc2.\overline{Pc3}$ ---- First word phase of execute "A" instruction (Fwa).

$Pc1.Pc2.\overline{Pc3}$ ---- Additional word phase of execute "A" instruction (Awa).

$Pc1.\overline{Pc2}.\overline{Pc3}$ ---- Last word phase of execute "A" instruction (Lwa).

$\overline{Pc1}.Pc2.Pc3$ ---- First word phase of execution of instruction "B" (Fwb).

$Pc1.Pc2.Pc3$ ---- Additional word phase for execution of instruction "B" (Awb).

$Pc1.\overline{Pc2}.Pc3$ ---- Last word phase of execution of instruction "B" (Lwb).

$\overline{Pc1}.\overline{Pc2}.Pc3$ ---- Hold (Ho).

The control phases A*wa*, A*wb* and H*o* may last more than one word time. All other control phases last one word time. All phase changes take place at P0 bit time. The basic cycle of the computer is IR→E*x*A→E*x*B→IR . . . E*x*A and E*x*B are comprised of three phases, these are F*w*, A*w* and L*w* with the appropriate suffix *a* or *b*.

The H*o* phase is not used in the normal cycling of the computer. It is used for starting, stopping, cycling under the control of test equipment, and during certain memory interrupts.

The equations for the three phasing flip-flops are as follows. These equations will be developed using the schematic representation of FIGURE 6, and the table of FIGURES 7 and 8. The tables of FIGURES 7 and 8 list those states following which the particular flip-flops must be a "1."

$$\begin{aligned} Pc1 &= Fwa\ (4+5)+Awa\ (7+8)+Fwb\ (11+12)+Awb\ (15+16) \\ &= Fwa\ (E+D)+Awa\ (C+\overline{C})+Fwb\ (E+D)+Awb\ (C+\overline{C}) \\ &= (Fwa+Fwb)(E+D)+Awa+Awb \\ &= Fw(E+D)+Aw \\ &= Fw\ (E+D)+Aw\ (E+D)+\overline{E+D} \\ &= (Fw+AW)\ (E+D)+Aw\ \overline{E}\ \overline{D} \end{aligned}$$

The A*w* phase will not be entered if $\overline{E}\ \overline{D}=1$; therefor the term A*w* $\overline{\mathrm{E}}\ \overline{\mathrm{D}}$ is redundant and may be eliminated.

$$Pc1=Pc2\ (MUL+DVD+\phi\phi S)$$

C.A.=P0

$$\begin{aligned} Pc2 &= IR(1+2)+Fwa(5)+Fwb(12)+Fwa(6)+Awa(8)+Awb(16)+Lwa(10) \\ &= IR(Ab1+\overline{Ab2})+(Fwa+Fwb)(D+D)+Fwa\ \overline{A}\ \overline{D}\ \overline{E}+(Awa+Awb)(\overline{C}+\overline{C})+Lwa\ \overline{GP41} \\ &= IR+FwD+Fwa\ \overline{A}\ \overline{D}\ \overline{E}+Aw\overline{C}+Lwa\ \overline{GP41} \\ &= IR(GP41+\overline{GP41})+FwD+Fwa\ \overline{A}\ \overline{D}\ \overline{E}+Aw\overline{C}+Lwa\ \overline{GP41} \\ &= (IR+Lwa)(\overline{GP41})+IRGP41+FwD+Fwa\ \overline{A}\ \overline{D}\ \overline{E}+Aw\overline{C} \end{aligned}$$

The term *IR.GP*41 can never be true at *IR.P*0 and may be eliminated.

$$Pc2=\overline{Pc3}\ \overline{Pc2}\ \overline{GP41}+Fw\ (MUL+DVD+L\phi S)+Fwa\ \overline{MUL}\ \overline{DVD}\ \overline{L\phi S}\ \overline{RTA}\ \overline{F\phi S}\ \overline{CMI}\ \overline{GP41}+Aw\ \overline{Ar10}\ \overline{Ar11}\ \overline{Ar12}\ \overline{Ar13}\ \overline{Ar14}$$

C.A.=$P0$ $$\begin{aligned} Pc3 &= IR(2)+Fwa(6)+Lwa(10)+Fwb\,[(11)+(12)+(13)]+Awb\,[(15)+(16)]+(Lwb+Ho)\,[(18)+(20)] \\ &= IRAb1+Fwa\ \overline{ADE}+Lwa\ \overline{GP41}+Fwb\ (E+D+\overline{D}\ \overline{E}\ Pc0)+Awb(C+C)+(Lwb+Ho)(Pc0+Pc0) \\ &= IRAb1+Fwa\ \overline{A}\ \overline{D}\ \overline{E}+Lwa\ \overline{GP41}+Fwb\ (E+D+Pc0)+Awb+(Lwb+Ho)Pc0 \\ &= IRAb1+Fwa\ \overline{A}\ \overline{D}\ \overline{E}+Lwa\ \overline{GP41}+Fwb(E+D)+Fwb\ Pc0+Awb\ (Pc0+1)+Awb\ (D+E)+\overline{D+E}+(Lwb+Ho)Pc0 \\ &= IRAb1+Fwa\ \overline{A}\ \overline{D}\ \overline{E}+Lwa\ \overline{GP41}+Fwb\ (E+D)+Fwb\ Pc0+Awb\ (D+E)+\overline{D+E}+(Lwb+Ho)Pc0 \\ &= IRAb1+Fwa\ \overline{A}\ \overline{D}\ \overline{E}+Lwa\ \overline{GP41}+(Fwb+Awb)(D+E)+Awb\ \overline{D}\ \overline{E}+(Lwb+Ho+Fwb+Awb)Pc0 \\ &= IRAb1+Fwa\ \overline{A}\ \overline{D}\ \overline{E}+Lwa\ \overline{GP41}+Pc3Pc2(D+E)+Awb\ \overline{D}\ \overline{E}+Pc3\ Pc0 \end{aligned}$$

$$Pc3=IRAb1+Fwa\ \overline{MUL}\ \overline{DVD}\ \overline{L\phi S}\ \overline{RTA}\ \overline{F\phi S}\ \overline{Cm1}\ \overline{GP41}+Lwa\ \overline{GP41}+Pc3\ Pc2\ (MUL+DVD+\phi\phi S)+Pc3\ Pc0$$

C.A.=$P0$

The term A*wb* $\overline{\mathrm{D}}\ \overline{\mathrm{E}}$ was eliminated as in P*c*1.

The five least significant flip-flops of the Address Register 19 (A*r*10–A*r*14) are used as a word counter during the A*w* phase to determine the duration of the A*w* phase. For the Multiplication (MUL) and Division (DVD) instructions, the number of word times of the A*w* phase is fixed at 13 and 27 respectively. The number of word times for the A*w* phase is automatically set into the word counter at *Fw.P*10 by the logic and the word counter decrements one count each word time. When the word counter indicates zero, the A*w* phase is terminated and the L*w* phase is entered. The Address Register 19 is free to be used as a word counter during the A*w* phase since no memory addressing takes place at that time.

The Address Register 19 is also used as a word counter during the long shift (L$\phi$S) operation. For this latter operation, a different number is inserted into the word counter, but apart from that the operation is the same as for the A*w* phase. The number inserted into the word counter (A*r*10–A*r*14) for the (L$\phi$S) operation is a variable, and it is derived from the address field of the (L$\phi$S) instruction. No special logic is required to place the number in the Address Register because the normal routing of the address properly positions the numbers therein.

When the Address Register is to be used as a word counter, its flip-flops A*r*11, A*r*12 and A*r*14 are set at P10 bit time of the F*w* phase if the command multiplication (MUL); and the flip-flops A*r*10, A*r*11, A*r*13 and A*r*14 are set at that time if the command is division (DVD). The least significant bit is represented by the flip-flop A*r*14. The clock at *Fw.P*10 for loading the original number is disabled if a shift command is programmed so as to prevent the previously loaded address from changing.

The logic associated with the flip-flops A*r*10–A*r*14 when these are to function as a word counter, may be expressed as follows:

$$Ar14=Fw(MUL+DVD)+\overline{Fw(MUL+DVD)}\ Ic14\ (\ldots)$$

$$Ar13=FwDVD+\overline{Fw(MUL+DVD)}\ Ic13\ (\ldots)$$

$$Ar12=FwMUL+\overline{Fw(MUL+DVD)}\ Ic12\ (\ldots)$$

$$Ar11=Fw(MUL+DVD)+\overline{Fw(MUL+DVD)}\ Ic11\ (\ldots)$$

$$Ar10=FwDVD+\overline{Fw(MUL+DVD)}\ Ic10\ (\ldots)$$

C.A. for $Ar14\text{–}Ar10=(Fwa\overline{BR2}+Fwb)\ \overline{\phi\phi S}\ P10$

The counter logic becomes active during A*w*. Each stage changes state when it receives a clock. The clock allow logic prevents all clocks except when flip-flops lower order stages are all in the zero state. A*r*14 receives a clock each word time.

$Ar14=\overline{Ar14}\ Aw+\overline{Aw}\ Ic14\ (\ .\ .\ .\ )$
$C.A.=Aw\ P10$
$Ar13=\overline{Ar13}\ Aw+Aw\ Ic13\ (\ .\ .\ .\ )$
$C.A.=\overline{Ar14}\ Aw\ P10$
$Ar12=\overline{Ar12}\ Aw+\overline{Aw}\ Ic12\ (\ .\ .\ .\ )$
$C.A.=\overline{Ar13}\ \overline{Ar14}\ Aw\ P10$
$Ar11=\overline{Ar11}\ Aw+\overline{Aw}\ Ic11\ (\ .\ .\ .\ )$
$C.A.+\overline{Ar12}\ \overline{Ar13}\ \overline{Ar14}\ Aw\ P10$
$Ar10=0$
$C.A.=\overline{Ar11}\ \overline{Ar12}\ \overline{Ar13}\ \overline{Ar14}\ Aw\ P10$ No set logic is provided for A*r*10 during A*w* since no count will arise where it is required to set. If all zeros are placed in the counter by the shift command address field, it will be treated like a sixteen place shift.

For fast shift operations (FφS) the counter functions as a bit counter during F*w*, the shifting operation being completed during that phase. The counter does not, in this case, control the phasing; rather it controls the shifting of the C Register.

The logic is similar to that just explained except that no clocks are allowed after the counter has reached zero. If it begins at zero, no clocks will be allowed.

$Ar14=Ar14\ F\phi S\ Fw+\overline{F\phi S\ Fw}\ Ic14\ (\ .\ .\ .\ )$
$C.A.=Fw\ F\phi S\ (Ar10+Ar11+Ar12+Ar13+Ar14)$
$Ar13=Ar13\ F\phi S\ Fw+\overline{F\phi S\ Fw}\ Ic13\ (\ .\ .\ .\ )$
$C.A.=Fw\ F\phi S\ (Ar10+Ar11+Ar12+Ar13)\ \overline{Ar14}$
$Ar12=\overline{Ar12}\ F\phi S\ Fw+\overline{F\phi S\ Fw}\ Ic12\ (\ .\ .\ .\ )$
$C.A.=Fw\ F\phi S\ (Ar10+Ar11+Ar12)\ \overline{Ar13}\ \overline{Ar14}$
$Ar11=Ar11\ F\phi S\ Fw+\overline{F\phi S\ Fw}\ Ic11\ (\ .\ .\ .\ )$
$C.A.=Fw\ F\phi S\ (Ar10+Ar11)\ \overline{Ar12}\ \overline{Ar13}\ \overline{Ar14}$
$Ar10=0$
$C.A.=Fw\ F\phi S\ \overline{Ar11}\ \overline{Ar12}\ \overline{Ar13}\ \overline{Ar14}$ The computer described above is capable of performing a plurality of different control operations, in response to corresponding instructions. These different control operations will now be discussed.

The first operation to be considered is the "Load Index" (LIA, LIB). The Load Index instruction designates that the Index Register A or Index Register B is to be loaded. The Load Index operation requires one word time.

In carrying out the Load Index instruction, the selected Index Register A or B reads the shifting least six bits of the Instruction Register 16 (FIGURE 9), this being achieved during the instruction read-in phase (IR), rather than carrying out a normal circulation.

Whether programmed in the A or B instruction, the Load Index operation takes place during the instruction read-in phase. The effect of the operation is to place the least six bits (**I*r*9–I*r*14) of the instruction word from the Instruction Register 16** into the selected Index Register A or B.

In the logic equation for **X*a*1 and X*b*1**, the term $\overline{BR2}$ prevents the B part of a BR2 instruction from being interpreted as an LIA or LIB order.

$Xa1=Ir14\ IRLIA^{*}\ \overline{BR2}+Xa6\ IR\ \overline{Fw}\ \overline{(LIA^{*}\ \overline{BR2}\ IR)}$
$Xan=Xa(n-1)$
$n=2\text{–}6$
$C.A.\ for\ Xa1\text{–}Xa6=IR(P16\text{–}P11)+(P23\text{–}P18)$
$Xb1=IR14\ IRLIB^{*}\ \overline{BR2}+Xb6IR\ Fw\ \overline{(LIB^{*}\ \overline{BR2}\ IR)}$
$Xbn=Xb(n-1)$
$n=206$
$C.A.\ for\ Xb1\text{–}Xb6=(P16\text{–}P11)+IR(P23\text{–}P18)$ The computer is also capable of responding to a "Data Transfer" instruction (DAT). This instruction also takes one word time for execution. The operation is shown in FIGURE 10. The Data Transfer instruction (DAT) transfers data in the C Register into the Index Registers, simultaneously transferring the contents of the Index Registers into the C Register, depending upon four control bits in the instruction. Any combination of four possibilities may be programmed.

| | Control bit |
|---|---|
| (a) C→Index A | A*r***8** |
| (b) C→Index B | A*r***9** |
| (c) Index A→C | A*r***6** |
| (d) Index B→C | A*r***7** |

If an Index Register is to be loaded from the C Register, it will copy the C Register rather than recirculating. Index Register A is loaded during P23–P18 bit times, and Index Register B is loaded during P16–P11 bit times. If the C Register copies the Index Registers, the corresponding time intervals will apply. The operation takes place during the first word time phase (F*w*).

During the Data Transfer Instruction (DAT), the Index Registers will either copy C27 or recirculate; the C Register will either copy the indicated index register or zeros. At the conclusion of the operation, those segments of the C Register not reserved for the storage of Index Register values will be zeros. If no flag bits are set, the Index Registers will not be changed and the C Register will be all zeros.

The DAT operation is represented by the following logic equations:

$Co=[Xa6\ AR6\ (P23\text{–}P18)+Xb6\ Ar7\ (P16\text{–}P11)]$
$DAT\ Fw$
$Xa1=C27\ Fw\ CIA+\overline{Fw\ CIA}\ Xa6\ \overline{Xc1}$
$Xan=Xa(n-1)$
$n=2\text{–}6$
$C.A.\ for\ Xa1\text{–}Xa6=P23\text{–}P18$
$Xb1=C27\ Fw\ CIB+\overline{Fw\ CIB}\ Xb6\ \overline{Xc1}$
$Sbn=Xb(n-1)$
$n=2\text{–}6$
$C.A.\ for\ Xb1\text{–}Xb6=P16\text{–}P11$ A further operation which may be performed by the computer is the "Load F Register" (LDF). This also is a one word operation. In response to the (LDF) instruction, and as shown in FIGURE 11, the F register is loaded at *Fw.P*17 from the address field of a programmed instruction, after the address of the instruction has been transferred to the Address Register 19.

The loading of the F Register is as follows:

$Fr1=Ar10$
$Fr2=Ar11$
$Fr3=Ar12$
$Fr4=Ar13$
$Fr5=Ar14$
$C.A.\ for\ Fr1\text{–}Fr5=LDF.Fw.P17$ Under normal operating conditions, if the most significant address bit in the instruction (**I*r*6) is "0," the five most significant bits in the Address Register 19 are forced to "0." This effectively blocks one-half of the memory 24** for use as operands. Therefore, to permit total memory access, a flip-flop TMA is provided which, when set, causes the F Register value to be used regardless of the address field value. The flip-flop TMA is set by a discrete output, and it remains set until a second discrete output causes it to reset.

$Tma=\overline{Ar14}$
$C.A.=IN0\ Fw\ P27\ Ar6\ Ar7\ Ar8\ Ar9\ Ar10\ \overline{Ar11}\ Ar12$
$\overline{Ar13}$
$Ar1=Fr1\ (Tma+Ir6)(IR+Lwa+Fwa\ \overline{Cm1}\ \overline{RTA}\ \overline{MUL}$
$DVD\ \phi\phi S\ BR2)$
$Arn=Frn(Tma+Ir6)(\ .\ .\ .\ )$
$n=2\text{–}6$ A "Halt" command (HLT) may be programmed in the computer, but only in a B instruction.

The computer phasing progresses from F*wb* to H*o*, because the flip-flop P*co* is set at *Fwb.P*12. The flip-flop P*co* remains true, preventing the computer from entering the I*r* phase until an externally generated signal P*b*1 goes false at P17.

The logic equation for the flip-flop P*co* is as follows:

$$Pco=HLT.Fwb.P12+Pco\ (H1t.Pb1+\overline{P17})$$

The computer also incorporates a "Branch Within Field" instruction (BWF). This instruction is executed in one word time. The "Branch Within Field" operation, as shown in FIGURES 12A–12D, causes the computer to change its next instruction from the address specified by the address field of the instruction plus the five most significant bits of the instruction counter if the sign of the C Register is positive or zero; otherwise to proceed in sequence.

The "Branch Within Field" operation begins with the address field of the instruction being strobed into the Address Register 19 at *IR.P*17 time (FIGURE 13A). At *Fw.P*11, where the branch is programmed, the least nine bits of the address register are transferred to the Instruction Counter 12 if the branch condition is met, as indicated by $Cm1=1$ (FIGURE 13B).

During the next bit time (FIGURE 13C), the setting of the Instruction Counter is transferred to the Address Register. The next word time is an (IR) phase. If the A Register value was zero or positive, both the Address Register and the Instruction Counter maintain the new instruction address. If the A Register value was negative, the Instruction Counter was not changed.

When a "Branch Within Field" (BWF) instruction is programmed during E*x*A, and the branch condition is met, then the phasing deviates from its normal progression, going from F*wa* to IR. That such a deviation is to take place is indicated by $Cmi.Fwa.P0=1$. C*mi* can be true at *Fwa.P*0 time only as a result of a BWF command. If the sequence F*wa*→*IR* takes place the associated B instruction is ignored ($Cmi=\overline{Ao}.Bwf.Fw.P27+Cmi.\overline{P0}$).

If BWF occurs in the A instruction, the following equations apply:

$Arn=IrnIR$
$n=6\text{–}14$
C.A. for $Ar6\text{–}Ar14=IR\ P17$
$Icn=Arn\ P11$
$n=6\text{–}14$
C.A. for $IC6\text{–}IC14=Cmi\ P11$
$Arn=Icn\ Cmi\ \overline{IR}\ \overline{Lwa}+Frn\ (Ir6+Tma)(Fwa\ \overline{Cmi}\ \ldots)$
$n=1\text{–}5$
$Arn=Icn\ Cmi\ \overline{IR}\ \overline{Lwa}+Irn\ (Fwa\ \overline{Cmi}\ \ldots)$
$n=6\text{–}14$
C.A.$=Fwa\ \overline{BR2}\ \overline{\phi\phi S}\ P10$ If BWF occurs in the B instruction, the following equations apply:

$Arn=Irn\ (Fwa\ \overline{Cmi}\ \overline{RTA}\ \overline{MUL}\ \overline{DVD}\ \overline{\phi\phi S}\ \overline{BR2}+Lwa)$
$n=6\text{–}14$
C.A. for $Ar6\text{–}Ar14=Fwa\ \overline{BR2}\ \overline{\phi\phi S}\ P10$
$Icn=Arn\ P11$
$n=6\text{–}14$
C.A. for $Ic6\text{–}Ic14=Cmi\ P11$
$Arn=Icn\ \overline{Fwa}\ \overline{IR}\ \overline{Lwa}$
$n=1\text{–}14$
C.A. for $Ar1\text{–}Ar14=Fwb\ \overline{\phi\phi S}\ P10$ As previously explained, the Instruction Counter increments by one count each F*wb* phase. If a BWF command is programmed in a B instruction and the branch condition is met, a precaution must be taken to prevent any alteration of the five most significant bits in the Instruction Counter by the generation of a carry into those bits as the Counter shifts through its incrementer. The carry flip-flop C*i*1, is therefore not allowed to set.

$$Ci1=Fwb\ P27\ \overline{Pp1}\ \overline{P27\ \overline{Ao}\ BWF\ Fw}$$

The computer is also capable of executing a "Branch 2" command. This instruction is designated "BR2." The operation requires two word times for its execution. The "Branch 2" command uses both the A and B instructions. The phasing is the same as for two one-word commands. A complete fourteen bit address is contained within the double instruction to which the program should branch if the branch condition is met.

The A instruction for the Branch 2 command contains the five-bit order code indicating "Branch 2," and the least nine bits of the branch location. This part of the instruction is handled in a normal manner, with the order code being placed in the Order Register. At *Fwa.P*0, the order register is not allowed to change, nor is the Address Register at *Fwa.P*10.

C.A. for $Or1\text{–}Or5=Fwa.P0.\overline{BR2}.\overline{MUL}.\overline{DVD}.\overline{\phi\phi S}$
C.A. for $Ar1\text{–}Ar14=Fwa.\overline{BR2}.\overline{\phi\phi S}.P10$ A branch control flip-flop C*m*1 sets at *Fwa.P*0 if the branch condition is met, and this flip-flop remains set for one word time, F*wb*. If the branch condition is not met, the flip-flop C*m*1 remains reset.

If the branch condition is not met the Instruction Counter setting which had been left unaltered, except for normal incrementing during *Fwb*, is transferred to the Address Register at *Fwb.P*10, and the next sequential instruction is read out during IR (FIGURE 13C). If the condition is met, the least nine bits in the Address Register are introduced into the corresponding bit positions in the Instruction Counter, in the same manner as in the "Branch Within Field" command.

At the same time, five bits of the Instruction Register, which at that time contains the B instruction, are transferred to the five most significant bits of the Instruction Counter causing it to contain the jump address. The next bit time the Address Register copies the Instruction Counter, and at P0 the phasing proceeds to the instruction read-in phase (IR).

The routing of address information during the "Branch 2" command is similar to the "Branch Within Field" command, except for the loading of the five most significant bits of the Instruction Counter from the Instruction Register.

The logic equations are as follows:

$Ic_1=Ir10.P11$
$Ic_2=Ir11.P11$
$Ic_3=Ir12.P11$
$Ic_4=Ir13.P11$
$Ic_5=Ir14.P11$
C.A.$=Cm1.Or1.P11$

The O*r*1 term is true for BR2 but not for BWF.

There are three general classes of "Branch 2" commands. One deals with the condition of the accumulator, a second with the Index Registers, and a third with discrete input signals. The three types are distinguished by I*r*6 and I*r*7 derived from the B instruction.

| | Ir6 | Ir7 |
|---|---|---|
| (a) Condition of A register | 0 | 0 |
| (b) Tally index register | 1 | 0 |
| (c) Test discrete input | X | 1 |

The discussion thus far has indicated only that the flip-flop C*m*1 was set at *Fwa.P*0 if the specified condition was met. The following discussion will cover the determination of whether or not to branch.

The first type of "Branch 2" command, namely the condition of the A register, has four conditions, each dealing with the value of the A register. Four bits are provided in the B instruction to specify one or more of the combinations. If the specified condition is met, a branch will take place since the flip-flop C*m*1 will be set at *Fwa.P*0.

| | |
|---|---|
| (a) Zero or positive | *Ir*1 |
| (b) Not zero | *Ir*2 |
| (c) Negative | *Ir*3 |
| (d) Zero | *Ir*4 |

Conditions (a) and (c) are checked directly by the flip-flop C*m*1 at *Fwa.P*0 by noting the sign of the A Register contained in A27.

$$Cm1=(\overline{A27}.Ir1+A27.Ir3)\overline{Ir6}.\overline{Ir7}.Fwa.BR2.P0+Cm1.\overline{P0}$$

Conditions (b) and (d) depend on a scanning flip-flop C*m*2 which checks the A register, searching for a "1." If a "1" is found by the flip-flop C*m*2, it is set and it remains set throughout the first word time of the command (F*wa*). If the flip-flop C*m*2 is not set by *Fwa.P*0, the A Register is known to be zero so that $\overline{Cm2}.Fwa.P0$ indicates that condition (d) is met. The above can be expressed logically as:

$$Cm2=Ao.\overline{Ir6}+Cm2.Fw$$
$$Cm1=(\overline{Cm2}.Ir4+Cm2.Ir2)\overline{Ir6}.\overline{Ir7}.Fwa.BR2.P0 +Cm1.\overline{P0}$$

To program an unconditional jump, conditions (a) and (c) could both be programmed (*Ir*1.*Ir*3=1), or conditions (b) and (d) (*Ir*2.*Ir*4=1).

This leads to a condition where the flip-flop C*m*1 must be set:

$$Cm1=(\overline{A27}+A27)\overline{Ir6}.\overline{Ir7}.Fwa.BR2.P0$$
$$Cm1=(\overline{Cm2}+Cm2)\overline{Ir6}.\overline{Ir7}.Fwa.BR2.P0$$

A second class of "Branch 2" commands concerns the Index Registers A and B. In addition to checking the specified Index Register, this class of Branch 2 command also causes the register to decrement. After decrementing, if the selected Index Register is not zero, a branch will take place.

Two bits of the B instruction designate which Index Register A or B is to be chosen:

| Index register | |
|---|---|
| A (TBA) | *Ir*1 |
| B (TBB) | *Ir*2 |

The decrementing of the selected register takes place during F*wa*. The logic is written for X*a*1 and X*b*1, with X*c*1 serving as the carry flip-flop. The flip-flop X*c*1 is set at P24 bit time, if TBA is programmed, and remains set until *Xa*6=0. The logic for TBB is similar with X*c*1 setting at P17.

$$Xc1=[(Xc1\,\overline{Xa6}+P24)\,TBA+(Xc1\,\overline{Xb6}+P17)\,TBB]\,Fwa$$
$$Xa1=(\overline{Xa6}\,Xc1\,\overline{IR}+Xa6\,\overline{Xc1})\,\overline{FwCIA}\,\overline{LIA^*\,\overline{BR2}\,IR}$$
$$Xan=Xan-1$$
$$n=2\text{–}6$$
$$Xbn=Xbn-1$$
C.A. for $Xa1\text{–}Xa6=P23\text{–}P18$
$$Xb1=(\overline{Xb6}\,Xc1\,\overline{IR}+Xb6\,\overline{Xc1})\,\overline{FwCIB}\,\overline{LIB^*\,\overline{BR2}\,IR}$$
$$n=2\text{–}6$$
C.A. for $Xb1\text{–}Xb6=P16\text{–}P11$ The flip-flop C*m*2 is set if a "1" is detected in the selected Index Register as it shifts for decrementing. In order to detect when the register has become zero, the flip-flop C*m*2 checks X*a*5 or X*b*5, which is the equivalent of checking the output of the decrementer.

$$Cm2=(Xa5.Ir1+Xb5.Ir2)Ir6+Cm2.Fw$$
$$Cm1=Cm2.Ir6.\overline{Ir7}.Fwa.BR2.P0$$

Two special cases should be noted:

(1) If a TBA or TBB is programmed, and the selected index register is in the zero state, the index register will change to $63_{10}$ and a branch will take place.

(2) If both TBA and TBB are programmed $$(Ir1.Ir2=1)$$

both index registers will decrement by one count and a branch will take place unless both registers are zero after decrementing.

The third type of "Branch 2" command addresses an input discrete signal which, if true, causes the branch to occur. Six bits of the B instruction (I*r*1–I*r*6) feed a selection matrix which chooses the signal to be tested. Up to sixty-four discrete inputs may be handled with this command. Since the B instruction is static in the Instruction Register after *IR.P*11, 6.6 microseconds are available for the selection matrix to stabilize, the selected signal being tested at *Fwa.P*0. The output of the selection matrix is designated GN56.

$$Cm1=GN56.Ir7.Fwa.BR2.P0$$

The case may arise where it is necessary to branch to a B instruction. One bit is provided (I*r*9) in the B instruction of all types of Branch 2 commands. This bit specifies that a skip ExA operation is to take place.

If the flip-flop I*r*9 is true, a flip-flop A*b*1 is set. This indicates that the next IR phase is to be followed by F*wb* rather than F*wa*, if the branch condition is met.

It is, of course, necessary to provide special logic to route the B instruction to the Order Register and Address Register during IR. This is done by reading the B instruction from the Memory Data Register at P24 bit time, instead of reading the A instruction if A*b*1 is true. If the B instruction is a store command, the Memory Initiate Pulse occurs at *IR.P*8. The normal IP at *Fwb.P*27 is inhibited. The logic for the A*b*1 flip-flop is as follows:

$$Ab1=BR2.Cm1.Ir9$$
$$Ir1=Md0.\overline{Ab1}.P24+Md14(P24.Ab1+P17)$$
$$\text{C.A.}=(P24+P17)IR$$

Another control bit I*r*8 in the B instruction of any Branch 2 command may indicate that the setting of the Instruction Counter 12 of FIGURE 1 be shifted into the C Register during F*wb* if the branch condition is met. The purpose of this operation is to place the setting of the Counter in a position to be stored in a succeeding operation. By this means, the point at which the normal program of the computer deviates from its normal sequence may be remembered.

The C Register copies the setting of the Instruction Counter through the Incrementer 14 so that the address shifted to the C Register represents the address of the next instruction to be executed upon the return to the normal computer program.

The fourteen bit address occupies bits P26–P13 in the C Register. The bit positions P12–P0 will be zero; bit position P27 depends on A*b*2.

$$Co=[Ir8.Cm1.Si1(\overline{Ic14}+\overline{Ci1})(Ic14+Ci1)+C27(\overline{Ir8} +\overline{Cm1})+Ab1.P27]\,BR2.\,Fw$$

The computer is also capable of executing a "Return Address" instruction (RTA). This operation is executed in one word time. The "Return Address" command is an indirectly addressed jump command. The combination of the F Register and the address field of the instruction locate a word from memory which is strobed into the C Register and then shifted into the Instruction Counter. The operation takes place during the first word (F*w*) phase. When a "Return Address" command is programmed during F*wa*, the phasing proceeds to IR, skipping ExB.

The "Return Address" consists of fourteen bits (P26–P13 in the memory). Another bit (P27) may indicate Skip A. The P27 bit may be set by program control or through a program interrupt.

$$Ic1=C27.Fw.RTA$$
$$Icn=Icn=1.Si1$$
$$N=2\text{–}14$$
$$Ab1=Md27.RTA$$
$$C.A.=P27.Pc2$$

The program interrupt capability of the computer provides a means for interrupting a program in progress so as to perform a program of more immediate importance. Upon completion of the interrupt program, the computer is capable of returning to the point of deviation and of continuing the original program.

The computer control will allow a program interruption to occur only at specified times. The basic rule is that no interruption may take place when the computer is in some condition which it cannot reconstruct at some later time.

Program interruptions, when allowed, take place during the last word of ExA or ExB. The control section of the computer issues a pulse (P*a*1) to the input-output section. If an interrupt request has been received, the flip-flop GP41 will be set prior to the generation of the Memory Initiate Pulse.

When the flip-flop GP41 is set, a special set of input lines originating in the input-output section of the computer are caused to override the Address Register 19 in FIGURE 1. The setting of the flip-flop GP41 also causes the mode control circuit to indicate read-restore, and the phasing to go to IR. The effect is to cause an instruction chosen by the address lines from the input-output section to be read from the memory.

The instruction thus chosen is a Branch 2 (with the jump specified), and the Store Return Address control bit set in order to store the setting of the Instruction Counter in the C Register.

The interrupt program proceeds to store the contents of registers whose values will be changed by the new program, this being done before proceeding to its primary purpose. Having completed the program, the registers are restored to their former values under program control, and a Return Address Order restarts the program at the point it was interrupted.

If the aforesaid interruption occurs during ExA, the Skip A control bit, which is stored along with the return address, must be set so that at the end of the interrupt program, the original program will be entered at ExB. The flip-flop A*b*2 is set if GP41 is true during ExA, thus causing a "1" to be written in the P27 position with the return address.

The Instruction Counter normally increments during F*wb*. Such incrementing cannot be allowed during the initial BR2 command in the interrupt program, since an improper return address would be stored during *BR2.Fwb*.

The flip-flop P*p*1 sets at P0 when GP41 is true, and it remains set until the order code at P0 is no longer BR2. The flip-flop P*p*1 prevents the incrementer carry from setting at *Fwb.P27*.

$$Ab2=GP41\,(Fwa+Lwa)+Ab2\,\overline{Fwb\ P0}$$
$$Pp1=GP41+Pp1\ BR2$$
$$C.A.=P0$$
$$Si1=Fwb\,P27\,\overline{Pp1}\,\overline{P27\,\overline{Ao}\,BWF\,Fw}$$
$$Co=[(\overline{Ic14}+\overline{Ci1})(Ic14+Ci1)\ Ir8\ Cm1\ Si1+Ab2\ P27]\ BR2\ Fw$$

Logic implementation to place the contents of the F Register in the C Register is not provided. Therefore, it is necessary to have stored in each upper field of the Memory 24, that portion of the memory described by a "1" in the most significant bit in the address field, some value from which the old F Register setting may be derived, and to store this word in working storage, if the F Register is to be used in the interrupt program.

Orders which may, when completed, contain a value in the C Register which is not also contained in the A Register, must not be followed by an interrupt routine. This obtains because the contents of the C Register are lost during the Branch 2 command where the return address is shifted into the C Register. Orders thus eliminated are "Store," "Load," "Index," "Data Transfer," "Branch Within Field," "Branch 2," "Load F,' "Input-Output," "Add Lower" and "Track Lower."

The Return Address Command, in addition to its primary function, may be used to set a control flip-flop which causes the A section of the indicated instruction to be skipped. If a P*a*1 pulse were allowed following this order, the Skip A information bit could be lost.

Program interruptions can be disallowed by a programmed command which prohibits such interruptions. Requests for interruptions will be ignored until a subsequent order cancels the first. This control acts on P41 in the input/output section.

$$Gpa1=P12.H1.H2.TMA\ [Fw(ADU+SBU+LDBA+EXT)+Lw]$$

A number of addresses for initial orders of interrupt sub-routines is virtually unlimited, depending on the number of alternate address lines controlled by the input-output section. In a constructed embodiment of the invention, four starting addresses have been implemented.

A capability for entering external data directly into the Memory 24 of FIGURE 1, independent of the program in progress, may be incorporated into the computer. The storage will take place during the A*w* phase when the memory is idle, causing no delay in the regular program. Alternately, if no A*w* phase occurs by the end of E*x*B, a one word H*o* phase is specially inserted for the memory cycle. The phasing is controlled by a flip-flop Pc0.

$$Pc0=Gp42$$

When a request for storage is received by the input-output section, the control section is informed at P17 of F*wb*, A*wa*, A*wb*, L*wb* or H*o* by the term *Gp*42. The alternate address lines controlled by the input-output section overrides the Address Register outputs, an alternate set of input lines controlled by the data to be stored override the C Register outputs, and the mode control is set for store. An Initiate Pulse takes place at P4 storing the data. Control of the memory is then relinquished by the input-output section, and the computer proceeds in its normal phasing.

There is no limit on the number of addresses which the input-output section may choose for storing data directly in the memory. In the constructed embodiment, four addresses have been limited. Also, full twenty-eight bit words may be stored.

The memory control consists of furnishing Initiate Pulses to the Memory 24, as well as mode control signals and addresses. The access time of the memory used in the constructed embodiment of the invention is 1 microsecond, or five bit times. The cycle time is 4.5 microseconds or twenty-three bit times. The Address Register and Mode Control must be set up prior to the Initiate Pulse. Data In must likewise be static prior to the Initiate Pulse.

Operands are required for all arithmetic operations, Extract, Load A, Load B and Return Address. Operands must be available, that is, static in the Memory Data Register 24*b* at the beginning of the F*w* phase. Consequently, an IP must be generated at P4 of the preceding word or earlier. F*wa* may be entered only from IR; F*wb* may be entered from F*wa*, L*wa* or IR (in the case of Skip A).

The following term in the logic for the IP gate provides pulses for A operands or B operands when Skip A is indicated.

$$IP_{gate}=IR.P8(ADD+SUB+LDS+EXT+RTA+MUL+DVD)$$

The Initiate Pulse for B operands occurs during F*wa* if the A operation is a one word operation. Otherwise, the pulse occurs during L*wa*.

$$IP_{gate}=[Fwa(\overline{MUL+DVD+\phi\phi S})+Lwa]$$
$$(ADD+SUB+LDS+EXT+RTA+MUL+DVD)^{*}P8$$

The initiate pulse for instructions must take place at or before P1 of the word preceding the IR phase.

$$IP_{gate}=[Fwa(\overline{MUL+DVD+\phi\phi S})+Lwa]\overline{\phantom{xxx}}$$
$$(RTA+Cm1+GP41)P8+[Fwb(\overline{MUL}$$
$$+\overline{DVD+\phi\phi S})+Lwb]P4+Ho\ \overline{Pc0}\ P4$$

Since the H*o* phase may last for more than one word time, the IP is issued only during the last H*o* phase as indicated by $\overline{Pc0}$.

If F*wb* is a store operation, the IP cannot be generated until the data is static in the C Register. That is, at *Fwb.P27*. If F*wa* is a store operation, the IP occurs during *IR.P8* since the C Register is static at that time. If Skip A is indicated and, in addition, the B instruction is STC, the initiate pulse occurs at *IR.P8* and is not allowed at *Fwb.P27*.

$$IP_{gate}=IR\ P8\ STC+Fwb\ P27\ STC\ \overline{Ab1}$$

Whenever GP42 is true at P4 an IP is issued to store memory interrupt data.

$$IP_{gate}=GP42.P4$$

At no time do pulses occur with a period less than 4.6 microseconds.

The mode control flip-flop M*c*1 is reset unless a store operation is to take place. A read-restore memory operation is indicated by M*c*1 until a store operation is determined to be the next operation. Once set for storing, the level does not change as long as successive store operations are programmed; otherwise it returns to its original level.

At *IR.P*17, the flip-flop M*c*1 is set if the order code in the Instruction Register (A instruction) is STC.

$$mc1=J\ STC^{*}\ \overline{Pc3}\ \overline{BR2}\ \overline{GP41}\ \overline{RTA}\ \overline{Cm1}\ C.A.\mp P17$$

During E*x*A ($\overline{Pc3}=1$) the flip-flop M*c*1 is set if STC*. However, certain exceptions must be observed.

If the B instruction is to be skipped M*c*1 will not be set. Conditions for skipping E*x*B are $GP41+RTA+Cm1$. The $\overline{BR2}$ term prevents the B instruction of a BR2 command from setting the flip-flop M*c*1 in case the five most significant bits correspond to the STC code. The terms BR2, GP41, RTA and C*m*1 will be false at *IR.P*17.

If GP41 goes true, the flip-flop M*c*1 will be reset at the next clock time. If GP42 goes true, the flip-flop M*c*1 will be set at P17 bit times.

$$Mc1=J(STC^{*}\overline{GP41}\ \ldots+GP42)\ C.A.=P17+GP41+\overline{J}$$

The J terms insure that at turn-on the Mode Control will indicate read-restore.

The address is supplied to the memory in parallel from the Address Register. The address is set up prior to the Initiate Pulse, being strobed into the Address Register at P17 of IR and at P10 of other word times.

Addresses for storing data in a memory interrupt operation are applied at P18; instruction address for program interrupt are applied at P11.

The invention provides, therefore, an improved high speed, large capacity, general purpose digital computer which is extremely flexible in its operation and which exhibits a high degree of reliability.

While a particular embodiment of the invention has been described, modifications may be made. The following claims are intended to cover all such modifications which fall within the scope of the invention.

What is claimed is:

1. A digital computer including: a memory for storing binary signals representative of a plurality of operand words and of a plurality of double-instruction words, each instruction in each of said double-instruction words having an address portion indicating the address in memory of respective ones of the operand words, and each instruction having an order portion indicating the operation to be performed on each such operand word; a memory data register included in said memory for holding the operand words and the double-instruction words selected from said memory; an address register; circuitry coupled to said address register and to said memory for controlling the selection of the operand words and of the double-instruction words from said memory and the introduction thereof to said memory data register in accordance with the address in said address register; instruction counter means coupled to said address register for inserting in said address register the address of the next double-instruction word to be executed after each such double-instruction word has been executed; an instruction register for holding the individual instructions of each double-instruction word in said memory data register; an order register for holding the order portion of each of the aforesaid instructions in said instruction register; logic circuitry coupled to said memory data register and to said instruction register for transferring the first instruction of the double-instruction word in said memory data register to said instruction register at a first selected time during a particular operational phase of the computer, and for transferring the address portion of said first instruction to said address register and the order portion of said first instruction to said order register and the second instruction of said double-instruction word to said instruction register at a second selected time during said particular operational phase; an index register for storing an address-modifying word; an adder circuit coupled to said index register and to said instruction register; and further logic circuitry coupled to said index register and to said instruction register for shifting during a time interval between said first and second selected time the address portion of the instruction in said instruction register and the word in said index register serially through said adder circuit and into said instruction register to modify said last-named address portion.

2. The digital computer defined in claim 1 in which said instruction register comprises a plurality of flip-flops, and in which the state of said flip-flops are controlled by the instruction in said instruction register, and in which said last-named further logic circuitry is activated only when one of the said flip-flops assumes a predetermined state as established by the particular instruction in said instruction register.

3. The digital computer defined in claim 1 and which includes logic circuitry coupling said instruction register to said index register to transfer a portion of a selected instruction in said instruction register to said index register during a predetermined operation of the computer.

4. The digital computer defined in claim 1 and which includes decrementer means for decrementing the word in said index register during a predetermined operation of the computer.

5. The digital computer defined in claim 1 and which includes a further register for storing a supplemental address word, first logic circuitry coupling said further register to said address register to transfer the word in said further register to said address register to augment the address word in said address register, and further logic circuitry coupled to said address register and to said further register for transferring the address portion of a selected instruction from said address register to said further register during a predetermined operation of the computer.

6. The digital computer defined in claim 5 and which includes control circuitry coupled to said further register and to said address register for causing said first logic circuitry to be activated only under predetermined conditions established by the address word in said address register.

References Cited

UNITED STATES PATENTS

| | | | |
|---|---|---|---|
| 2,914,248 | 11/1959 | Ross et al. | 235—157 |
| 3,012,724 | 12/1961 | Williams et al. | 235—157 |

OTHER REFERENCES

The Central Computer of the Univac System, Manual of Operation, 1959, Sperry Rand Corp., pages 2–6.

Ledley: Large-Capacity Memory Techniques for Computing Systems, The Macmillan Co., N.Y., 1962, pages 28–30.

ROBERT C. BAILEY, *Primary Examiner.*

R. RICKERT, *Assistant Examiner.*